No. 798,682. PATENTED SEPT. 5, 1905.
A. A. KENT.
MEANS FOR PREVENTING STRAINS AND VIBRATIONS IN POWER TRANSMISSION DEVICES.
APPLICATION FILED SEPT. 20, 1904.

WITNESSES:

INVENTOR
Arthur Atwater Kent
BY
Edw. W. Vaill Jr.
ATTORNEY.

UNITED STATES PATENT OFFICE.

ARTHUR A. KENT, OF PHILADELPHIA, PENNSYLVANIA.

MEANS FOR PREVENTING STRAINS AND VIBRATIONS IN POWER-TRANSMISSION DEVICES.

No. 798,682.        Specification of Letters Patent.        Patented Sept. 5, 1905.

Application filed September 20, 1904. Serial No. 225,221.

*To all whom it may concern:*

Be it known that I, ARTHUR ATWATER KENT, a citizen of the United States, and a resident of Philadelphia, State of Pennsylvania, have invented certain new and useful Improvements in Means for Preventing Strains and Vibrations in Power-Transmission Devices, of which the following is a full, clear, and complete disclosure.

My invention relates to means for obviating the vibration or jarring due to reciprocating parts and variable driving forces in gearing and other means for transmitting power and for equalizing strains and pressures on bearings.

My invention is particularly applicable to gearing for transmitting power developed by prime movers, such as electric motors, steam or gas engines, and more especially by explosive-engines.

Briefly, my invention comprises the employment of a plurality of balances or fly-wheels which are rotatively connected, so as to turn or revolve in opposite directions, the connections between the fly-wheels and their shafts being such that the forces developed by the means which drive them and the forces developed by the rotation of parts themselves are neutralized or balanced, so that the vibrations or oscillations are thereby prevented or absorbed before being transmitted to the base or body upon which the wheels and prime mover are mounted.

For a full, clear, and exact description of two embodiments of my invention reference may be had to the following specification and to the accompanying drawings, forming a part thereof, in which—

Figure 1:
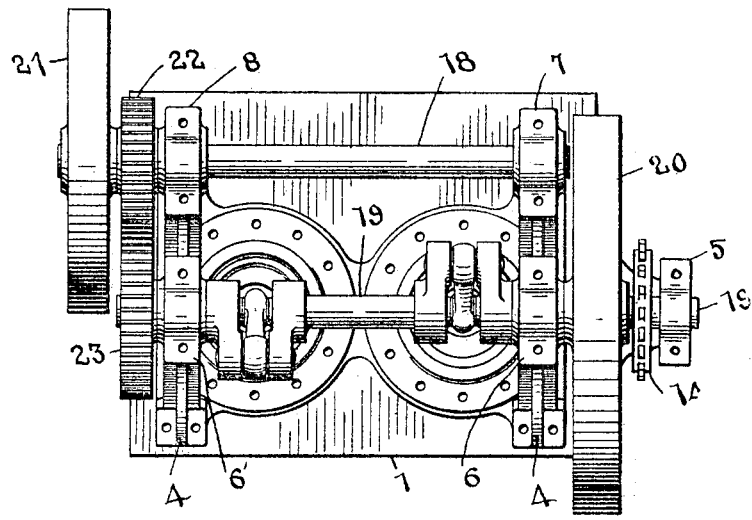
Figure 2:
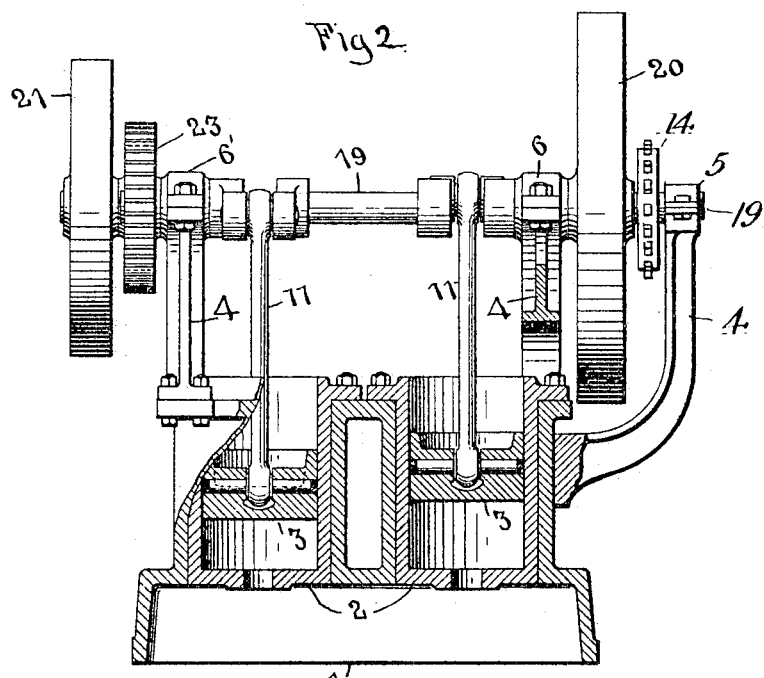

Figure 1 is a plan of an explosive-engine, showing my invention in connection therewith. Fig. 2 is an end elevation of the same, partly in section.

Referring to the drawings, the numeral 1 indicates a suitable base upon which is carried cylinders 2, within which are adapted to oscillate pistons 3. The base-plate 1 also carries suitable supports 4, which terminate in bearings or journal-boxes 5, 6, 6', 7, and 8.

A shaft 19 is rotatably carried in the bearings 5, 6, and 6', and attached to said shaft 19 is a gear-wheel 23. The shaft 19 also carries a fly or balance wheel 20 and a sprocket-wheel 14 or other means for transmitting the power to the point at which it is used.

The bearings 7 and 8 support a shaft 18, upon which is mounted a gear 22, which meshes with the gear 23, and a fly-wheel 21. The fly-wheel 21 is made smaller than the fly-wheel 20, and the gears 22 and 23 are relatively varied in proportions. This change in the proportions of the fly-wheels allows a reduction in the weight of one of the wheels, and the proportions of the gears are varied accordingly in order to increase the relative speed of the smaller fly-wheel, so that its effective inertia and momentum will be the same as that of the larger wheel in regard to the crank-shaft of the engine.

The operation of the parts of this embodiment of my invention will be obvious from an inspection of the drawings.

The effect produced by the arrangement of parts above described is to effectively balance the moving elements in such a manner as to obviate or neutralize all vibrations or shaking of the bed-plate or other support to which the engine and gearing are attached. In other words, the reactive effects of inertia and momentum are equalized with the active effects. The reactive effects are those which cause pressure upon the bearings and strains upon the connecting parts when the speed of the engine is accelerating after an explosion or is being retarded by compression in the cylinders. Furthermore, the gyratory effect of the parts revolving at high speeds is equalized, thus also reducing the strains upon the supports and bearings. The gyratory effects are especially noticeable when fly-wheels are used upon automobiles, for it will be evident that in an automobile which travels at a high speed around a sharp curve the gyratory effect or reaction is very great, owing to the tendency of the comparatively great masses of the fly-wheels to revolve about axes which extend in the same direction.

Having thus described the nature of my invention, I do not wish to be understood that the same is limited to the arrangement and proportion of parts herein set forth, for they may be varied to suit different conditions and uses—such as when applied to automobiles, launches, stationary engines, electric motors, electric street-cars, or any machine or device where vibrations due to parts revolving at a high speed or parts subject to accelerations and retardations are likely to occur.

The transmission-gearing need not necessarily consist of tooth or spur gears, but may be frictional or otherwise.

What I claim, and desire to protect by Letters Patent of the United States, is—

1. In combination with an engine, parallel shafts mounted on the frame thereof, a fly-wheel carried by each of said shafts, and gears connecting said shafts, the gear of the driving-shaft being of larger diameter than the gear of the driven shaft, said fly-wheels being respectively proportioned in weight to the diameters of said gears.

2. In combination with an engine, parallel shafts mounted on the frame thereof, a fly-wheel carried by each of said shafts, intermeshing gears carried by said shafts, and a plurality of driving-cranks carried by one of said shafts and connected with the pistons of the engine.

In witness whereof I have set my hand this 17th day of September, 1904.

ARTHUR A. KENT.

Witnesses:
 JOHN F. GRADY,
 EDWARD W. VAILL, Jr.